United States Patent [19]

Hollander

[11] Patent Number: 4,733,830
[45] Date of Patent: Mar. 29, 1988

[54] FISHING REEL

[76] Inventor: William J. Hollander, 5412 Valhalla Dr., Boulder, Colo. 80301

[21] Appl. No.: 779,156

[22] Filed: Sep. 23, 1985

[51] Int. Cl.⁴ ............................................. A01K 89/02
[52] U.S. Cl. .......................... 242/84.5 R; 242/84.1 R; 242/118.4
[58] Field of Search .................. 242/84.5 R, 84.51 R, 242/84.53, 118.4, 118

[56] References Cited

U.S. PATENT DOCUMENTS

| | | | |
|---|---|---|---|
| 2,083,927 | 6/1937 | Sinex | 242/84.5 R |
| 2,316,314 | 4/1943 | Burdick | 242/84.5 R |
| 2,536,583 | 1/1951 | Tank | 242/84.5 R |
| 2,553,784 | 5/1951 | Parks | 242/84.5 R |
| 2,772,839 | 12/1956 | Morton | 242/84.5 R |
| 3,416,746 | 12/1968 | Hull | 242/84.5 R |
| 3,526,370 | 9/1970 | Arsenault | 242/84.5 R |
| 4,515,325 | 5/1985 | Uto | 242/84.51 R |

Primary Examiner—Billy S. Taylor
Attorney, Agent, or Firm—Grunewald & Lampe

[57] ABSTRACT

Disclosed herein is a fishing reel having as its principal features a manually adjustable, automatic, drag differential which applies greater resistance to rotation of the line spool in the line letting out rotation than in the winding up direction; a closely related manually engageable brake for selective added resistance to spool rotation in the letting out direction; a dynamically balance free-standing spindle and removable line spool combination wherein the two are interlocked for joint rotation, while spools may be easily and rapidly interchanged in a spindle as desired; and the structure in the spool side walls with an arrangement of cutout portions which provide dynamic balance and substantially vibrationless high speed rotation and lightness in weight and ventilation of the spool, without the requirement for addition of counter weights for balancing the spool.

7 Claims, 9 Drawing Figures

U.S. Patent  Mar. 29, 1988  Sheet 1 of 3  4,733,830
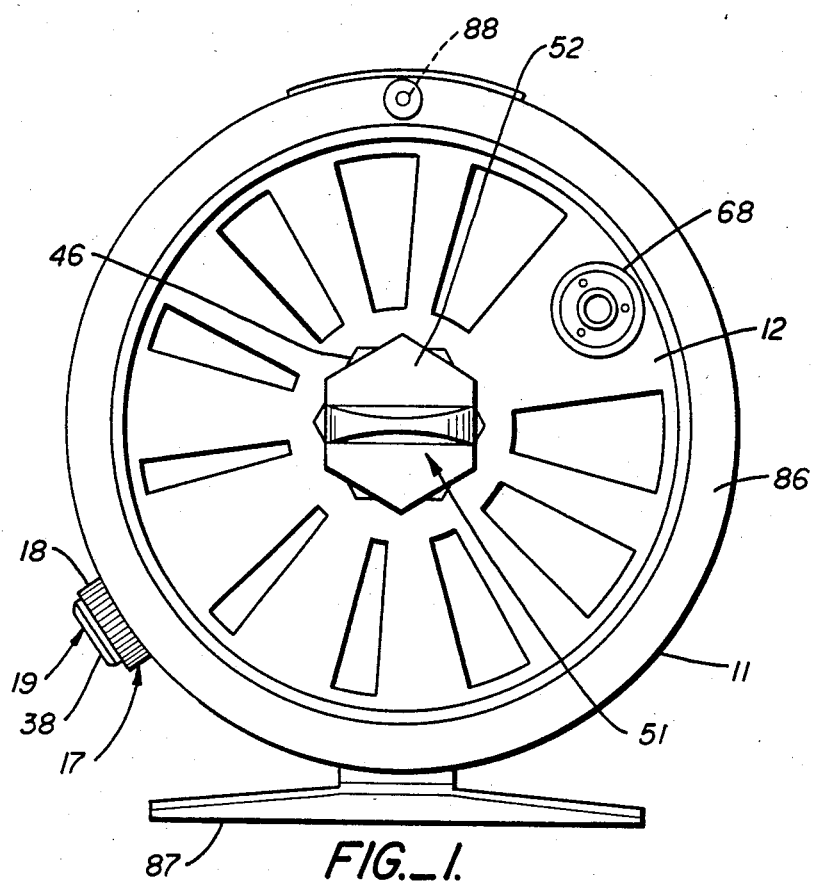
FIG._1.
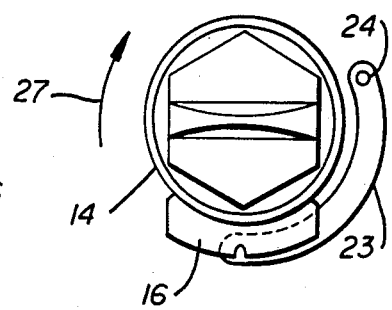
FIG._6.
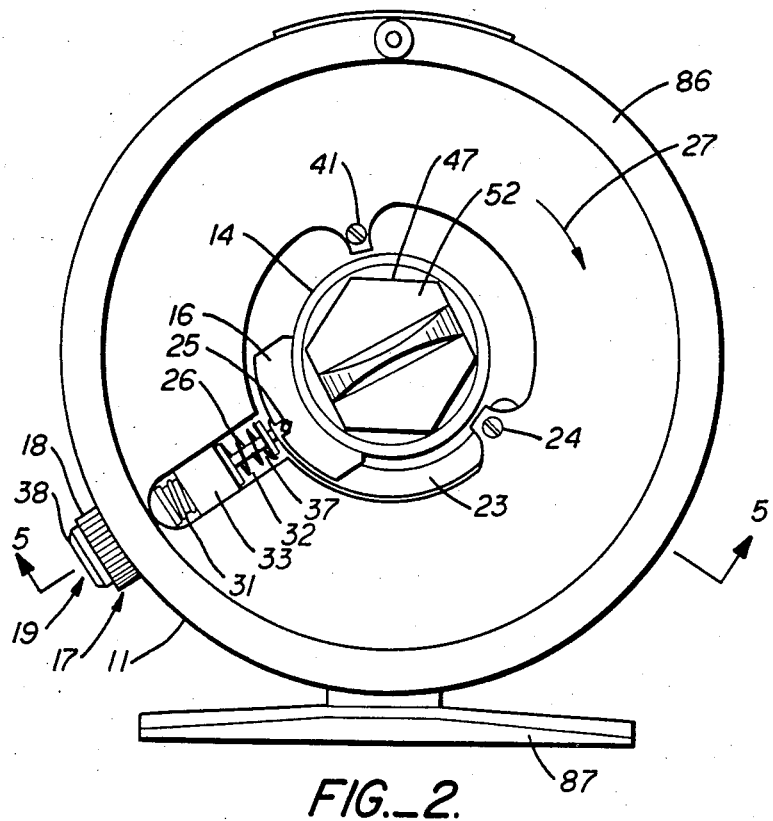
FIG._2.
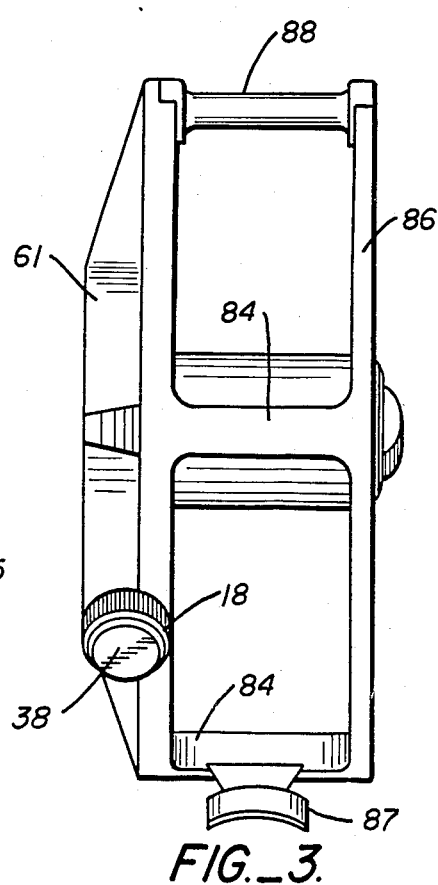
FIG._3.

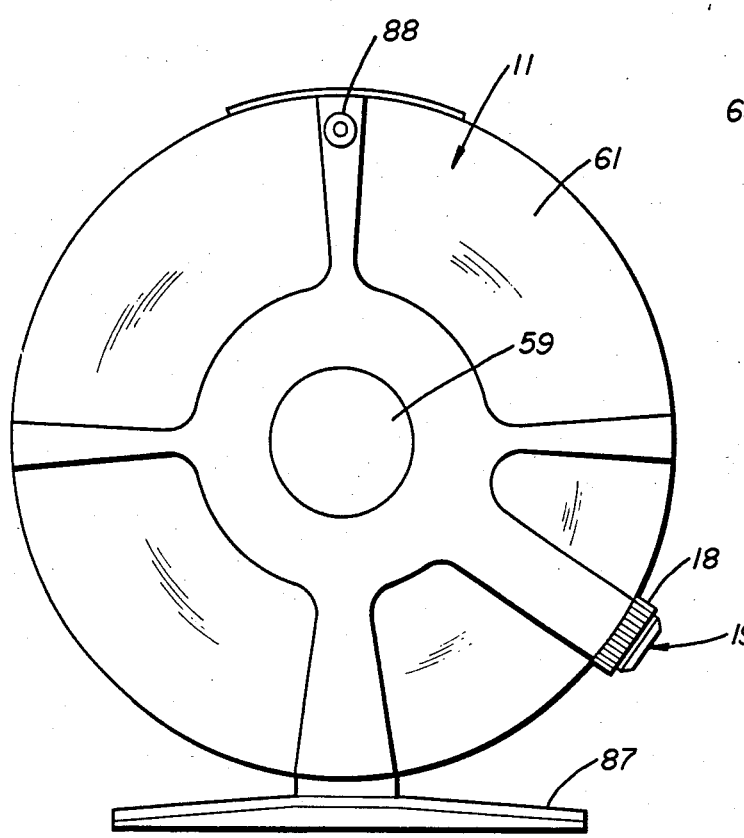
FIG._4.
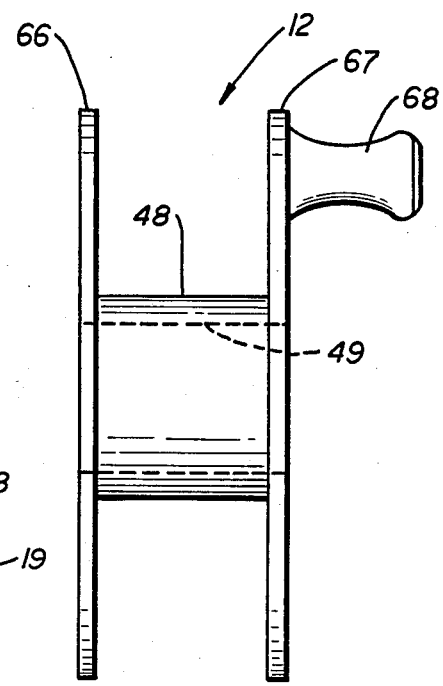
FIG._7.
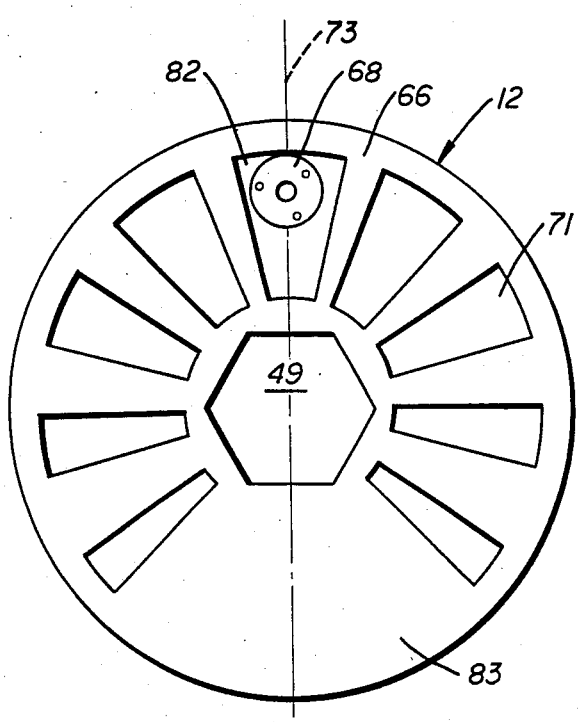
FIG._8.
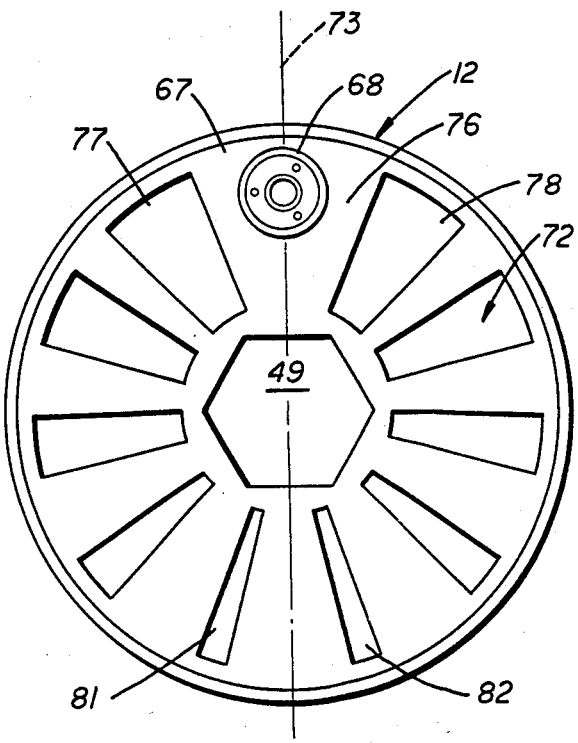
FIG._9.

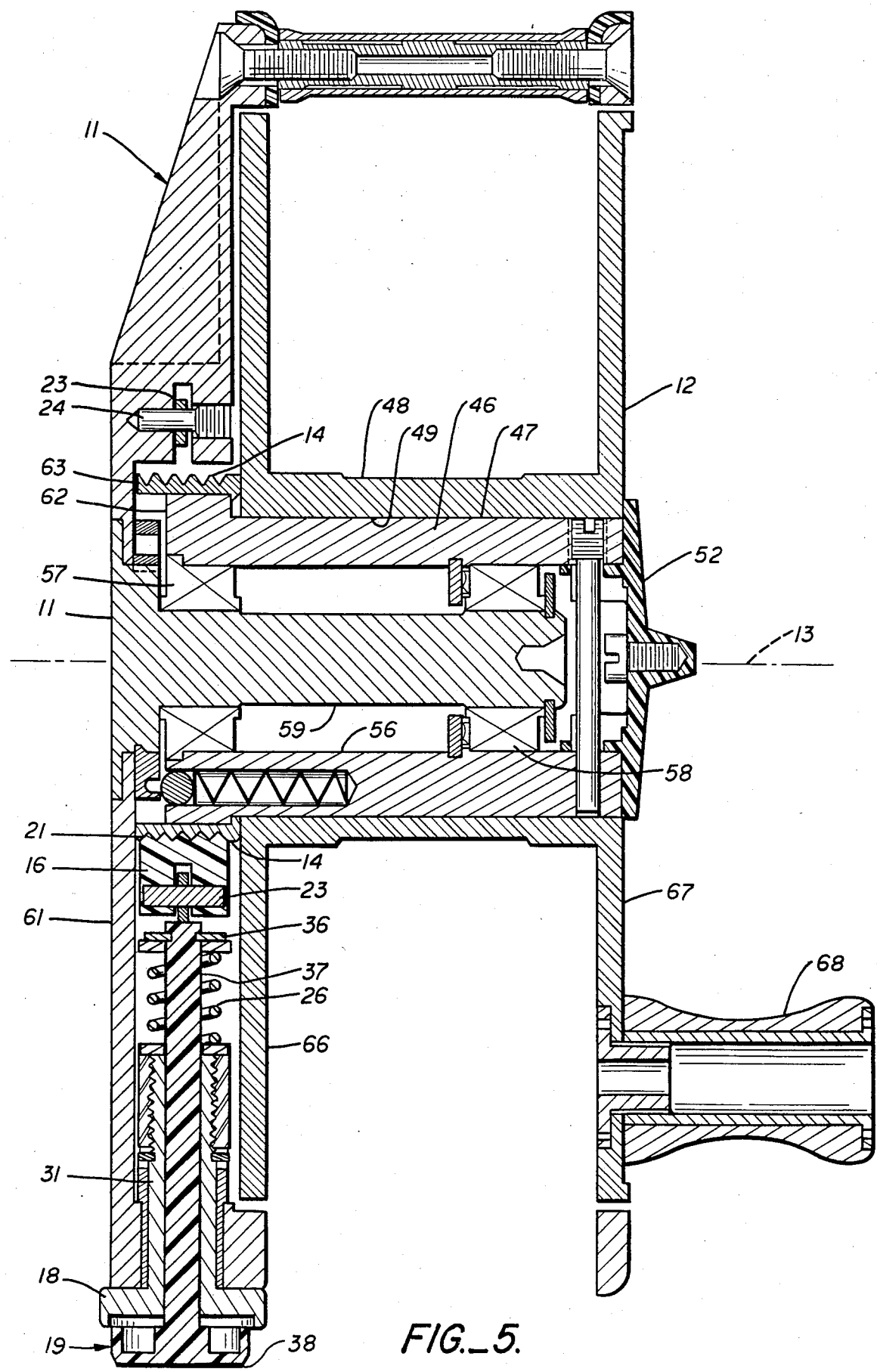
FIG._5.

FISHING REEL

BACKGROUND OF THE INVENTION

The invention relates to fishing reels and more particularly as a fly casting type reel where the line is hand stripped from the reel and payed out according to the techniques of fly casting and the reel is especially designed for the playing of relatively large, powerful fish where the use of a drag and brake are required to properly play and land the fish.

When a relatively large, powerful fish takes a hook and starts its run, a very rapid pay out of the line under some resistance is highly desirable. This resistance is commonly referred to as drag and its purpose is to tire the fish and enable the fisherman to reel in the fish before it takes off for a second run, the procedure being repeated until the fish is brought in and landed. The discretionary use of a supplemental brake on the line is also highly desirable in the playing and tiring of the fish. Preferably both the amount of drag and the use of the supplemental braking action are adjustable and manually controlled.

During the period that the fish makes its run, the reel spool is rotated at high speed and imbalances in the reel/spool structure will subject the reel and the adjacent butt end of the rod to heavy vibration which impedes the making of manual adjustment of the drag and selective application of the brake. Also while the use of drag and braking is important in playing the fish, particularly in limiting the length of its run, both are undesirable during the intermediate reeling in periods.

SUMMARY OF THE INVENTION

An object of the invention is to provide a reel of the character described in which the reel spool and supporting reel structure is dynamically balanced so as to insure a smooth, substantially vibration free running of the reel at high speed, as when a fish is making its run, so that the drag and brake adjustments may be readily, selectively manually controlled without being obstructed or hindered by vibrations or gyrations of the reel and the adjacent butt end of the rod.

Another object of the present invention is to provide a fishing reel of the character described in which the amount of preset drag is automatically varied depending upon the direction of rotation of the spool so that the drag is substantially reduced and provides minimum interference with the reeling in operation.

A further object of the invention is to provide a reel of the character described above in which both the amount of drag and selective application of the brake are most conveniently arranged for rapid, easy, sure and precise manual engagement and desired manipulation.

Still another object of the present invention is to provide a reel of the character described above in which a number of fishing line spools may be easily and quickly interchanged on the reel while always maintaining the highly desired dynamic balance above referred to.

Yet a further object of the present invention is to provide a reel which possesses the foregoing features in a structure having minimum weight while optimizing strength, durability and long life and corrosion resistance to fresh or salt water.

In brief the present reel is built for the most demanding situations an angler may encounter where every resource of skill, knowledge and finesse is required, and through its sophisticated design, significantly expands an angler's capacity to play and land big fish.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWINGS

FIG. 1 is a front elevation of a fishing reel constructed in accordance with the present invention.

FIG. 2 is a front elevation similar to FIG. 1 but with a line spool removed.

FIG. 3 is an end elevation of the reel.

FIG. 4 is a rear elevation of the reel.

FIG. 5 is an enlarged cross sectional view of the reel taken substantially on the planes of lines 5—5 in FIG. 2 but with the spool in place.

FIG. 6 is a fragmentary elevation showing the brake detail.

FIG. 7 is an end elevation of the line spool.

FIG. 8 is a rear elevation of the spool.

FIG. 9 is a front elevation of the spool.

DETAILED DESCRIPTION OF THE INVENTION

The fishing reel of the present invention comprises briefly a support 11 and a spool 12 for holding a fishing line, the spool being mounted on support 11 for rotation about a central axis 13 of the support and spool, the spool being rotatable in one direction for letting out of the line and in an opposite direction for winding up the line. One of the main features of the present device is the provision of a circular braking surface 14 positioned coaxially with an axis 13 and secured for rotation with spool 12, a brake member 16 mounted on support 11 for movement to and from surface 14 and means providing drag by applying a differential pressure of brake member 16 against surface 14, which pressure is greater in the letting out rotation of spool 12 than in the winding up direction of the spool. Further, means 17 has a manually adjustable part 18 for selectively setting the pressures and the amount of drag.

In addition to the above-mentioned differential drag means and functioning in close association therewith is means 19 mounted on support 11 for manual engagement and displacement and which is connected to apply selective added pressure to brake member 16 against surface 14 to provide selective braking of spool 12. In order to increase the frictional contact area between member 16 and surface 14 these parts are formed with at least one circular interfitting and mating ridge and groove 21 best seen in FIG. 5. Preferably surface 14 and brake member 16 are formed with rows of interfitting wedge shaped circular teeth and valleys which significantly enhance the retarding action of brake member 16 when applied to surface 14.

As a further feature of the present construction, the drag adjustment part 18 and the braking means are concentrically mounted for closely interrelated operation providing manual access to both at the same circumferential position on the reel, see FIGS. 1-3.

The means for providing the automatic drag differential on rotation of spool 12 in opposite directions, as above noted, here comprises a lever 23, best seen in FIGS. 2, 3 and 6 which is secured to brake member 16 by pivot pin 25 and has a pivot 24 spaced arcuately therefrom relative to the axis of rotation 13, and a spring 26 biasing brake member 16 to surface 14 whereby the frictional retarding force applied by a brake member to the surface is increased and decreased depending upon the direction of rotation of the spool. By spacing pivot 24 and brake member 16 at different circumferential positions relative to surface 14, some component of the force on the member 16 from the braking action is in the direction of the initial pressure, and adds to that pressure. This force multiplying effect occurs in the clockwise direction of rotation, as indicated by arrow 27 in FIGS. 2 and 6, which is in the direction of paying out of the fishing line. When the spool is rotated in an opposite direction to wind up the line, the action of the lever combination function is to decrease the pressure of member 16 against surface 14. This pressure differential is dependent upon the circumferential spacing of pivot 24 and brake member 16. I have found that about 110° will accomplish a preferred pressure differential.

Adjustment of the amount of drag pressures is here controlled by a screw mounted in a radial passageway 32 formed in support 11 and which is connected to spring 26 by means of a cross-head block 33 threadably mounted on screw 31 and formed and dimensioned for slidable reciprocation in passageway 32, block 33 bearing on one end of spring 26, here of helical form, while the opposite end of the spring bears on a retaining ring 36 which is secured to the inner end of a plunger 37 which in turn bears on brake member 16. Screw 31 is secured for rotation in place in the support so that rotation of an outer knurled part 18 will cause block 33 to advance or retract relative to spring 26 to adjustably set the pressure of member 16 against surface 14.

Means 19, here comprises the aforementioned stem-like plunger 37, which is mounted concentrically of screw 31 and has an inner end bearing on brake member 16 and an outer head 38 extending from the knurled outer end 18 of screw 31 for fingertip engagement and direct application of force to brake member 16. In this manner the manually applied brake is most conveniently accessible at the same circumferential position on the reel as the drag adjustment, whereby the angler may most conveniently effect selective braking of the spool in addition to the automatically applied drag differential. The angler has only to press on the slightly projecting enlarged head 38 of the plunger 37 to add any desired amount of braking force to the preset drag, allowing the angler to safely control the run of a powerful fish. Conventional "spool palming" is totally unnecessary. The foregoing structure provides a silky smooth drag which is precisely set by the knurled knob 18 and cannot be over-run by a large fish. At any setting from feather light to heavy and with the disposition of circular lever 23 as herein described, the angler reels against about 75% less resistance than the fish encounters when taking the line. A second pivot 41 is provided at the opposite circumferential side of surface 14, see FIG. 2, for easily converting the automatic drag for either left or right hand reeling. To accommodate the aforementioned mounting of the drag and brake adjusting means, screw 31 is made of tubular form to telescopically receive the stem of plunger 37.

Another feature of the present reel is the mounting of spool 12 on support 11 for quick and easy exchange of spools where different line weights and types are desired to be used. This is accomplished by a dynamically balanced free-standing spindle 46 journalled for rotation on support 11 and having a noncircurlar exterior surface 47, and forming spool 12 with a hub 48 having an axial passagewa 49 therethrough formed to telescopically receive spindle 46 in mated, rotatably interlocked, engagement with exterior surface 47, whereby the spool may be slipped over the free end of the spindle to operating position and reversely, slipped off of the spindle. A keeper 51 at the free end of spindle 46 is used to retain the spool in its operating position. Preferably, and as here shown, exterior surface 47 of spindle 46 and the interior wall of passageway 49 are formed of a dynamically balanced polygon, here of six equal, symmetrically balanced, sides with the polygon in the spool hub being slightly larger than the spindle for sliding telescopic movement thereon to and from its operating position. The keeper is here formed as a cap, rotatably mounted on the free end of the spindle and having an exterior form and dimensions matching the spindle exterior surface whereby the cap may be rotated to align its exterior with the exterior of the spindle so that the spool may be slipped over the cap after which the cap may be rotated to a position with portions of the cap projecting laterally from the spindle to capture the spool thereon (compare positions of the cap in FIGS. 1 and 2 and see also FIG. 5). Detents (not shown) are preferably used to indicate and secure cap 52 in its two relatively rotated positions. Where the spindle and cap are formed of the same polygonal forms, rotation of the cap to its keeper position disposes the corners of the polygon in overlapping position to the spool, see FIGS. 1 and 5.

As a feature of the present construction spindle 46 is of tubular form providing an interior wall, see FIG. 5, journalled by spaced ball bearings 57 and 58 for rotation on a stub shaft 59 secured to and projecting from a back wall 61 of support 11. Importantly, spindle 46 may be permanently secured and sealed in place on bearings 57 and 58 and shaft 59, in a manner which protects the bearings from the entry of dirt, water, etc. These bearings are designed to be self-lubricating and to provide a very low friction and free running of the spindle over an indefintely long period of use. Spindle 46 is here formed with an enlarged concentric base 62 which provides a support for the inner end of spool 12 and also a support for the circular braking surface 14, here provided by a separate sleeve member 63 mounted on base 62. Sleeve member 63 is here formed with a row of wedge shaped teeth and circular valleys for interfitting with similar teeth and valleys formed on the opposed face of brake member 16.

Spool 12 is formed with opposed disk shaped, spaced apart, side walls 66 and 67, see FIGS. 7-9, concentric with its hub 48 and a manually engageable handle 68 secured to and extending from the normally outer or front side 67 of the spool. As an important feature of the present invention, the spool is fashioned in a manner to provide a dynamic balance for handle 68 whereby the spool will provide substantially vibrationless, high speed, rotation about its axis, as occurs when the fish is making one of its runs. As here best seen in FIGS. 8 and 9, side walls 66 and 67 are formed with an asymmetrical arrangement of circumferentially spaced cutout portions which are varied in size and juxtaposed to dynamically balance handle 68, and the spool overall, for its smooth vibrationless high speed rotation. Several criteria are observed. The cutout portions on each wall are uniformly spaced on opposite sides of an axial plane indicated by line 73 on FIGS. 8 and 9. Side wall 67 is formed with a pie shaped solid portion 76 to which handle 68 is secured (FIG. 9) with the center of the handle mounted on the axial plane 73 centrally of portion 76. All of the cutout portions are similarly of pie shape with cutout portions 77 and 78 on opposite sides of solid portion 76 being the largest of the cutout portions on this side. Proceeding circumferentially from cutout portion 77 and 78 the cutout portions are uniformly spaced and of progressively decreasing size to the smallest cutout portions 81 and 82 symmetrically disposed on opposite sides of plane 73 opposite handles 68. On side wall 66 the largest cutout portion 82 is juxtaposed to solid section 76 and the cutout portions on this side wall are uniformly spaced but of decreasing size, symmetrically arranged with respect to plane 73 and with a relatively large pie shaped solid section 83 diametrically opposed to cutout portion 82 and handle 68. It will also be observed from a comparison of FIGS. 8 and 9 that there is provided a solid section on one side wall juxtaposed to cutout portion on the opposite side wall. The cutout portions are thus sized and positioned to provide the desired dynamic balance, thus achieving such balance by a lightening of the weight of the spool and providing ventilation, both desirable features, rather than achieving balance by means of added counter weights.

Support 11 is formed with a solid disk shaped back wall 61 which is formed to support the drag and brake mechanism and with axially extending, circumferentially spaced, arms 84 supporting a front ring 86 surrounding spool side wall 67 and a conventional foot 87 adapted for attachment to the butt end of a fishing rod. A line guide in the form of a small stainless steel roller 88 is mounted for rotation between ring 86 and back wall 61 and provides a smooth stripping of the line with minimal line wear.

What is claimed is:

1. In a fishing reel having a support and a spool for holding a fishing line, said spool being mounted on said support for rotation about an axis in opposite directions for letting out and winding up respectively of said line, the improvement comprising:
    means providing a circular braking surface positioned coaxially with said axis and secured for rotation with said spool;
    a brake member mounted on said support for movement to and from said surface;
    a lever secured to said brake member and having a pivot arcuately spaced therefrom relative to said axis of rotation;
    a spring biasing said brake member to said surface whereby the frictional retarding force applied by said brake member to said surface increases and decreases depending upon the direction of rotation of said spool;
    a manually engageable screw carried by said support and connected to said spring for selectively setting said pressures and the amount of drag; and
    a manually engageable plunger mounted concentrically of said screw and connected to said braking member and being manually engageable for applying selective added pressure of said brake member against said surface to provide selective braking of said spool in addition to said drag.

2. The fishing reel as defined in claim 1, said surface and brake member having at least one circular, interfitting and mating ridge and groove.

3. The fishing reel as defined in claim 1, and a dynamically balanced free-standing spindle journalled for rotation on said support and having a non-circular exterior surface; said spool having a hub with an axial passageway therethrough formed to telescopically receive said spindle in mated, rotatably interlocked, engagement with said exterior surface, whereby said spool may be slipped over the free end of said spindle to operating position and reversely, slipped off of said spindle, and
    a keeper at said free end to retain said spool in operating position.

4. The fishing reel as defined in claim 3, said keeper comprising a dynamically balanced cap rotatably mounted on said free end and having an exterior form and dimensions matching said spindle exterior surface,
    said cap having a first rotated position aligning said cap with said spindle for passage of said spool over said cap to and from operative position, and a second rotated position wherein a portion of said cap projects laterally from said spindle to capture said spool in its operative position.

5. The fishing reel as defined in claim 3, said spindle having an enlarged concentrically formed base providing a support for said spool and a concentric cylindrical periphery providing said braking surface; and
    said periphery and brake member being formed with rows of interfitting wedge shaped circular teeth and valleys increasing the area of contact between said surface and brake member.

6. In a fishing reel, a spool having a cylindrical hub adapted for rotational support about its axis and opposed disk shaped, spaced apart sidewalls concentric with said hub and a manually engageable handle secured to and extending from one of said side walls for winding up fishing line onto said spool, the improvement comprising:
    said side walls having an asymetrical arrangement of circumferentially spaced cut-out portions;
    said cut-out portions being varied in size and juxtaposed to dynamically balance said handle and spool for substantially vibrationless high speed rotation of said spool about its axis.

7. The spool as defined in claim 6, said cutout portions having a uniform circumferential spacing symmetrical to an axial plane through said handle leaving solid portions intermediate said cutout portions and with the cutout portions on one side wall juxtaposed to a solid portion on the other of said side walls and being progressively graduated in size to provide said dynamic balance.

* * * * *